3,536,743
PROCESS FOR PRODUCING METHYLCHLORO-
SILANES
Richard Schrader and Hubert Hennek, Freiberg, Karl
Dreier and Roland Bugge, Nunchritz, and Otto Hansel,
Lockwitz, Germany, assignors to VEB Chemiewerk
Nunchritz, Nunchritz, Germany, German Democratic
Republic
No Drawing. Filed Jan. 17, 1968, Ser. No. 698,382
Int. Cl. C07f 7/14
U.S. Cl. 260—448.2                                    4 Claims

ABSTRACT OF THE DISCLOSURE

Process for producing methylchlorosilanes, which comprises treating a silicon-ferrosilicon mixture or a copper-silicon alloy, after comminution, in a vibration mill, for a short time, and thereafter reacting it with methylchloride in the presence of a copper catalyst, whereby increased formation of dimethylchlorosilane is obtained at the expense of other reaction products. The process is so conducted that recirculation of the residual product is made possible.

---

Diorganochlorosilanes are increasingly in demand as starting materials in the production of silicon rubber.

In the known processes for making organochlorosilanes according to the "direct synthesis," alkyl- or aryl-chlorides are reacted with a mixture of silicon and copper powder or a copper-silicon alloy at elevated temperature. Primarily interesting in the process is the preparation of diorganodichlorosilanes.

Processes are further known which start from mixtures of pure silicon and copper powder. In yet other processes, the reaction between copper silicide and alkyl- or aryl-chlorides is controlled by the addition of chlorides of the metals zinc, aluminum, calcium or magnesium.

In the mentioned processes the purity of the silicon and the copper are of prime importance. Smooth reactions and good yields are only obtained when the sum of the contents in Si and Cu are at least 98%. The production of such starting materials of extreme purity is very expensive.

In processes which use silicon-ferrosilicon mixtures or copper-silicon alloys as starting materials, the yield is likewise dependent on the purity. That is why these processes are combined with a purification process of the starting materials.

It is a peculiarity of the mentioned processes that the starting materials are only partly reacted. The yield, calculated on silicon used, hardly reaches more than 60%.

Processes are therefore known in which the residues of the first chemical reaction are subjected to a second reaction at higher temperatures, partly with addition of aluminum chloride.

In another process the copper catalyst is added continuously or in batches during the chemical reaction so that the reaction is made to set in again and again, and the residue may be maintained at a low level.

It is a shortcoming of the process using the residues that the reaction proceed primarily in the direction of methyltrichlorosilane formation or, when chlorobenzene is added, leads to aromatic compounds.

It is the object of this invention to provide a method by which it is possible to arrive in the chemical reaction, with pure or technical starting material, to an increased formation of dimethylchlorosilane at the expense of the other reaction products.

It is another object to provide a process which leads to higher yields in methylchlorosilanes.

It is a further object of the invention to subject pure or technical starting materials to an appropriate mechanical treatment before the chemical reaction is effected, and to prepare it for a process carried out by circulation.

Other objects and advantages of the invention will become apparent from the following detailed description.

The objects above mentioned are realized in accordance with the invention in that a pure or technical mixture of silicon and ferro-silicon, or a copper-silicon alloy, is comminuted as usual, and subsequently treated for a short time in a vibration mill, and is then reacted with methylchloride in the presence of catalysts. Treatment in the vibration mill is in the order of 20 to 30 minutes.

By this mechanical treatment the course of the reaction is directed toward a higher yield in dimethyl dichlorosilane at the expense of other reaction products, a fact which was quite unexpected. At the same time the yield in methylchlorosilanes was increased.

It has further been found that the residue of the first chemical reaction, which contained elementary silicon, could be returned into the reaction chamber without a second treatment in a vibration mill and was capable of reacting once more with formation of dimethyldichlorosilane. During the cycle, a contact of the reacting materials with oxygen-containing gases has to be avoided.

Should the reactivity of the circulating material decline, it can again be treated in a vibration mill for a short time. This will then be once more followed by the chemical reaction with methylchloride, if necessary in the presence of catalysts.

By the repeated introduction of the starting material into the reaction chamber, and a repeated treatment in a vibration mill, if necessary, the amount of silicon in the mixture decreases gradually, and the process becomes exceptionally economical.

The process is also applicable for the use with other organohalides.

The invention will now be more fully explained by three examples, but it should be understood that these are given by way of illustration and not of limitation.

EXAMPLE 1

The starting material, technical ferrosilicon, is ground in a ball mill with screen and then treated with 94% silicon in a vibration mill with continuous throughflow. The time of treatment in the vibration mill is from 20 to 30 minutes. The starting material is fed to the mill and withdrawn after treatment continuously so that the discrete particles will take the above indicated time for their travel through the mill.

The treated ferrosilicon is mixed with copper powder in the ratio 10:1, and is introduced into a reaction vessel. 250 parts of the mixture are reacted continuously with 490 parts methylchloride per hour at 250 to 260° C. The reaction product consists of 507 parts methylchlorosilane which contained, among other components, 76.5% dimethyldichlorosilane and 13.5% methyltrichlorosilane.

If the same starting material was not treated in the vibration mill, but reacted under otherwise identical conditions, the yield in methylchlorosilanes is only 445 parts, with the content is dimethyldichlorosilanes at 55%, and that of methyltrichlorosilane at 33.5%.

In addition to ferrosilicon, similar results were obtained with copper-silicon alloys of equivalent quality.

Both the vibration mill and the reaction vessel are operating for months without interruption.

EXAMPLE 2

With a specially prepared copper-silicon alloy, containing 79% silicon and 11% copper, which is not suitable for the preparation of dimethyldichlorosilane according to known methods, entirely different results are obtained after treatment in a vibration mill, for 20 to 30 minutes.

250 parts of the treated copper-silicon alloy are reacted with 502 parts methylchloride per hour at 250 to 260° C. Obtained are 434 parts methylchlorosilane, which among other components contained 47% dimethyldichlorosilane and 26% methylchlorosilane.

If the same starting material is not treated in the vibration mill, but reacted under otherwise identical conditions, the yield in methylchlorosilanes is 426 parts, with the content in dimethyldichlorosilane at 11%, and that of methyltrichlorosilane at 43%.

EXAMPLE 3

From the reaction chamber of a technical plant a specimen of the powder forming the residue was taken out with exclusion of oxygen.

The specimen contained 55% silicon and 15% copper. It was subjected to a further reaction in a test apparatus. 111 parts of the residue were reacted with 203 parts of methylchloride per hour. Obtained were 185 parts methylchlorosilane containing 41% dimethyldichlorosilane.

In the above examples, the separation of dimethyldichlorosilane from methylchlorosilane is effected by the usual method of fractional distillation. The so obtained dimethyldichlorosilane is 99.9% pure.

Instead of using methylchloride in the reaction with the silicon material after treatment in the vibration mill, phenylchloride was used for introduction of the phenyl radical, and the results obtained were very satisfactory.

It should be understood, of course, that the foregoing disclosure relates only to preferred embodiments of the invention and that it is intended to cover all changes and modifications of the examples described which do not constitute departures from the spirit and scope of the invention as set forth in the appended claims.

What we claim is:

1. In a process for producing methylchlorosilanes by reaction of a preground starting material selected from a mixture of silicon-ferrosilicon or a copper-silicon alloy in the presence of a copper catalyst with methylchloride, the improvement of increasing the formation of dimethyldichlorosilane at the expense of other reaction products, which comprises subjecting the conventionally preground starting material to a mechanical treatment in a vibration ball mill, said mechanical treatment causing a breaking of the crystal lattices of the preground starting material, for about 20 to 30 minutes at elevated temperature, before passing it on to the reaction zone for reacting with methylchloride.

2. The process as defined in claim 1, wherein the temperature during treatment in the vibration ball mill is maintained between 250 and 260° C.

3. The process as defined in claim 1, wherein the residue from the reaction which contains elementary silicon is returned into the reaction process.

4. The process as defined in claim 3, wherein the residue from the recycled reaction material is subjected to a renewed treatment in the vibration ball mill when its reactivity declines.

References Cited

UNITED STATES PATENTS

| | | | |
|---|---|---|---|
| 2,380,997 | 8/1945 | Patnode | 260—448.2 X |
| 2,380,998 | 8/1945 | Sprung et al. | 260—448.2 X |
| 2,380,999 | 8/1945 | Sprung et al. | 260—448.2 X |
| 2,488,487 | 11/1949 | Barry et al. | 260—448.2 |
| 2,579,341 | 12/1951 | Schwenker | 260—448.2 |
| 2,595,767 | 5/1952 | Coe et al. | 260—448.2 |
| 2,598,435 | 5/1952 | Mohler et al. | 260—448.2 |

OTHER REFERENCES

Stelling et al., "Chemical Abstracts," 47, 1953, p. 6714.

TOBIAS E. LEVOW, Primary Examiner

P. F. SHAVER, Assistant Examiner

U.S. Cl. X.R.

260—448.2

5132

UNITED STATES PATENT OFFICE
CERTIFICATE OF CORRECTION

Patent No. 3,536,743  Dated October 27, 1970

Inventor(s) R. Schrader et al.

It is certified that error appears in the above-identified patent and that said Letters Patent are hereby corrected as shown below:

Claim 4, line 1 (in column 4, line 21), change "3" to -- 1 --.

SIGNED AND SEALED
DEC 22 1970

(SEAL)
Attest:

Edward M. Fletcher, Jr.
Attesting Officer

WILLIAM E. SCHUYLER, JR.
Commissioner of Patents

FORM PO-1050 (10-69)